(No Model.)
C. DUDLEY.
TRACE HOOK.
No. 349,632. Patented Sept. 21, 1886.
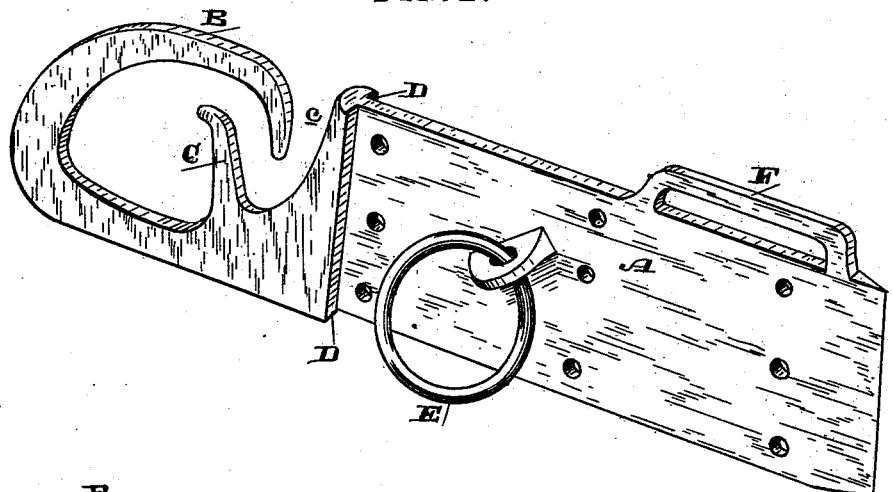
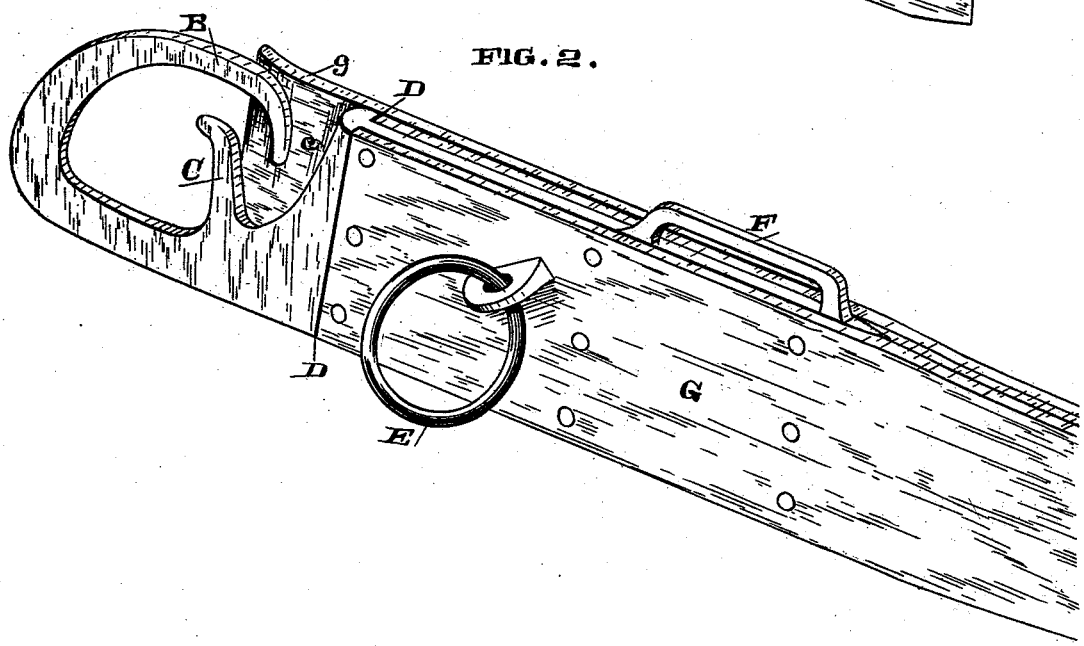

UNITED STATES PATENT OFFICE.

CHARLES DUDLEY, OF STOCKTON, CALIFORNIA.

TRACE-HOOK.

SPECIFICATION forming part of Letters Patent No. 349,632, dated September 21, 1886.

Application filed June 28, 1886. Serial No. 206,519. (No model.)

*To all whom it may concern:*

Be it known that I, CHARLES DUDLEY, of Stockton, San Joaquin county, State of California, have invented an Improvement in Trace-Hooks; and I hereby declare the following to be a full, clear, and exact description of the same.

My invention relates to that class of trace-hooks in which a plate is secured properly to the trace and has on its end a suitable engaging-hook; and my invention consists in the construction and combination of devices, which I shall hereinafter fully describe and claim.

The object of my invention is to provide a simple and effective trace-hook.

Referring to the accompanying drawings for a more complete explanation of my invention, Figure 1 is a perspective view of my trace-hook. Fig. 2 is a view showing its application to the trace.

A is a plate or casting, having formed upon one end the backwardly-curved hook B and the guard C, projecting within the space inclosed by said hook and passing beyond the end of the hook. It will be observed that between the point of the hook and the guard a passage, c, is left, whereby the hook may be easily engaged. The plate A is provided with a shoulder, D, on each side.

E is a ring attached to plate A.

F is a loop for the hip-strap.

It will be seen by reference to Fig. 2 that the plate A is inserted between the folds or layers of the trace G. If the trace is composed of three layers or folds, one fold on each side comes up flush with the shoulder D, while the third, g, passes by the shoulder and terminates just beyond the point of the hook B. The object of extending this fold of the trace is to guard the entrance to the hook, and thus prevent any portion of the harness from becoming entangled.

The object of the guard C is to prevent the butt-chain or other part with which the hook is engaged from getting loose. The ring E is for the purpose of tying to in leading two or more spans of horses behind each other.

The loop F is for the engagement of the hip-strap which holds the trace up.

I am aware that a trace-hook has been patented with a guard and a backwardly-curved hook; but in said hook the relative position of the guard and hook is not the same as in mine, the hook in that case being inside and the guard extending above it, while in mine the hook bends almost completely around, inclosing a space within which the guard projects beyond its end or point. This gives my hook an advantage both in the ease with which its engagement is effected and also in the effectiveness with which that engagement is maintained.

Having thus described my invention, what I claim as new, and desire to secure by Letters Patent, is—

1. The plate A, secured to the trace and having a hook at one end, in combination with the ring E on the side of the plate, substantially as herein described.

2. An improved trace-hook comprising the plate A, having the backwardly-curved hook B, the guard C, projecting within the space inclosed by said hook, and the ring E on the side of the plate, substantially as herein described.

3. An improved trace-hook comprising the plate A, having the curved hook B, the guard C within the space inclosed by the hook, and the loop F on the rear top edge of said plate, for engaging the hip-strap, substantially as herein described.

4. A trace-hook consisting of the plate A, having at one end the backwardly-curved hook B, forming between its point and the body of the plate the passage c, and the guard C, projecting within the space inclosed by the hook, said plate having shoulders D on each side, against which the folds of the trace abut, substantially as herein described.

5. A trace-hook consisting of the plate A, having formed at one end the backwardly-curved hook B, the guard C, projecting within the space inclosed by the hook, and the shoulders D on each side of said plate, in combination with the trace G, having a fold or layer on each side of the plate and abutting against the shoulders thereof, and a layer or fold, g, on one side passing the shoulder and terminating beyond the point of the hook, substantially as herein described.

6. A trace-hook consisting of the plate A, having formed at one end the backwardly-curved hook B, and the guard C, projecting within the space inclosed by the hook, the shoulders D on said plate, for fitting against the ends of the folds of the trace, the loop F at the rear top edge of the plate, for receiving the hip-strap, and the ring E on said plate, substantially as herein described.

In witness whereof I have hereunto set my hand.

CHARLES DUDLEY.

Witnesses:
T. A. CLOSE,
J. E. RICHARDSON.